United States Patent [19]
Maklad et al.

[11] 4,182,664
[45] Jan. 8, 1980

[54] RADIATION HARDNESS OF OPTICAL FIBERS

[75] Inventors: Mokhtar S. Maklad, Roanoke; George H. Sigel, Jr., Fairfax County; Gary W. Bickel, Roanoke, all of Va.

[73] Assignee: International Telephone and Telegraph Corporation, Nutley, N.J.

[21] Appl. No.: 802,745

[22] Filed: Jun. 2, 1977

[51] Int. Cl.$^2$ ............................................. B01J 1/10
[52] U.S. Cl. ........................ 204/157.1 H; 204/158 HE
[58] Field of Search ................. 204/157.1 H, 158 HE, 204/159.13; 250/492

[56] References Cited
FOREIGN PATENT DOCUMENTS
897696 5/1962 United Kingdom ................ 204/159.13

OTHER PUBLICATIONS

Ryan, Modern Plastics, vol. 31, No. 8, Apr., 1954, pp. 148, 150, 155 & 156, 158.

*Primary Examiner*—Howard S. Williams
*Attorney, Agent, or Firm*—John T. O'Halloran; Peter C. Van Der Sluys

[57] ABSTRACT

Optical fibers of silica and plastic composition are rendered relatively stable to nuclear radiation induced optical losses by preirradiating with a high initial radiation dosage. Subsequent exposure of the radiation hardended fibers produce substantially lower radiation induced optical loss and faster fiber transmission recovery rates.

15 Claims, 2 Drawing Figures

RADIATION HARDNESS OF OPTICAL FIBERS

BACKGROUND OF THE INVENTION

Optical fibers are finding more and more application in military situations as replacements for standard metal conductors for conveying information. The light weight and large information carrying capacity of the glass optical fibers readily fit the compact and mobile requirements of the military. One serious problem existing with optical fibers is the susceptability of the fibers to optical loss upon exposure to ionizing and nuclear radiation. In the event of radiation exposure in actual combat situations it is vital that the optical fibers continue to transmit with no interruptions caused by the changes that occur due to the effects of the radiation exposure.

When optical fibers containing a silica core and plastic optical cladding are exposed to nuclear radiation the silica material becomes less light transmissive due to the information of induced optical absorption bands within the silica core and the cladding material.

The sum effect of the changes occuring both within the silica core and the plastic cladding is a substantial decrease in the amount of light transmission through the optical fiber length.

The purpose of this invention, therefore, is to provide an optical fiber that is hardened to the effects of radiation exposure such that the fibers can continue to provide optical continuity after periods of severe radiation exposure.

SUMMARY OF THE INVENTION

Optical communication fibers containing glass and plastic materials are rendered relatively immune to radiation exposure by a method of radiation hardness treatment. The treatment comprises exposing the optical fibers to substantial doses of radiation ($10^5$ to $10^6$ rads) in excess of levels of radiation exposure likely to occur in actual combat conditions ($10^3$ rads). Pre-irradiation hardens the optical fiber materials to effectively render the fiber immune to further radiation induced optical losses.

DESCRIPTION OF THE PREFERRED EMBODIMENTS

In order to pretreat silica core optical fibers having a silicone optical cladding to render the optical fibers radiation-hardened, that is, relatively immune to the substantial optical losses induced by the exposure to nuclear radiations, several meters of silicone clad silica core fibers were indirectly exposed to the output of a high voltage linear accelerator. Since the discoloration and the optical absorption loss which occurs when optical fibers are exposed to nuclear radiation is in some way related to defect sites in the fiber structure, various dose levels of high energy radiation were utilized in an attempt to reduce the defects which could have been caused by the fiber drawing process. The method of eliminating the structure defect is based on the possibility that the defect can capture either free electrons or positive holes produced by intense radiation exposure such that the normal sites which remain would recover from further radiation exposure at a much faster rate.

Figure 1:
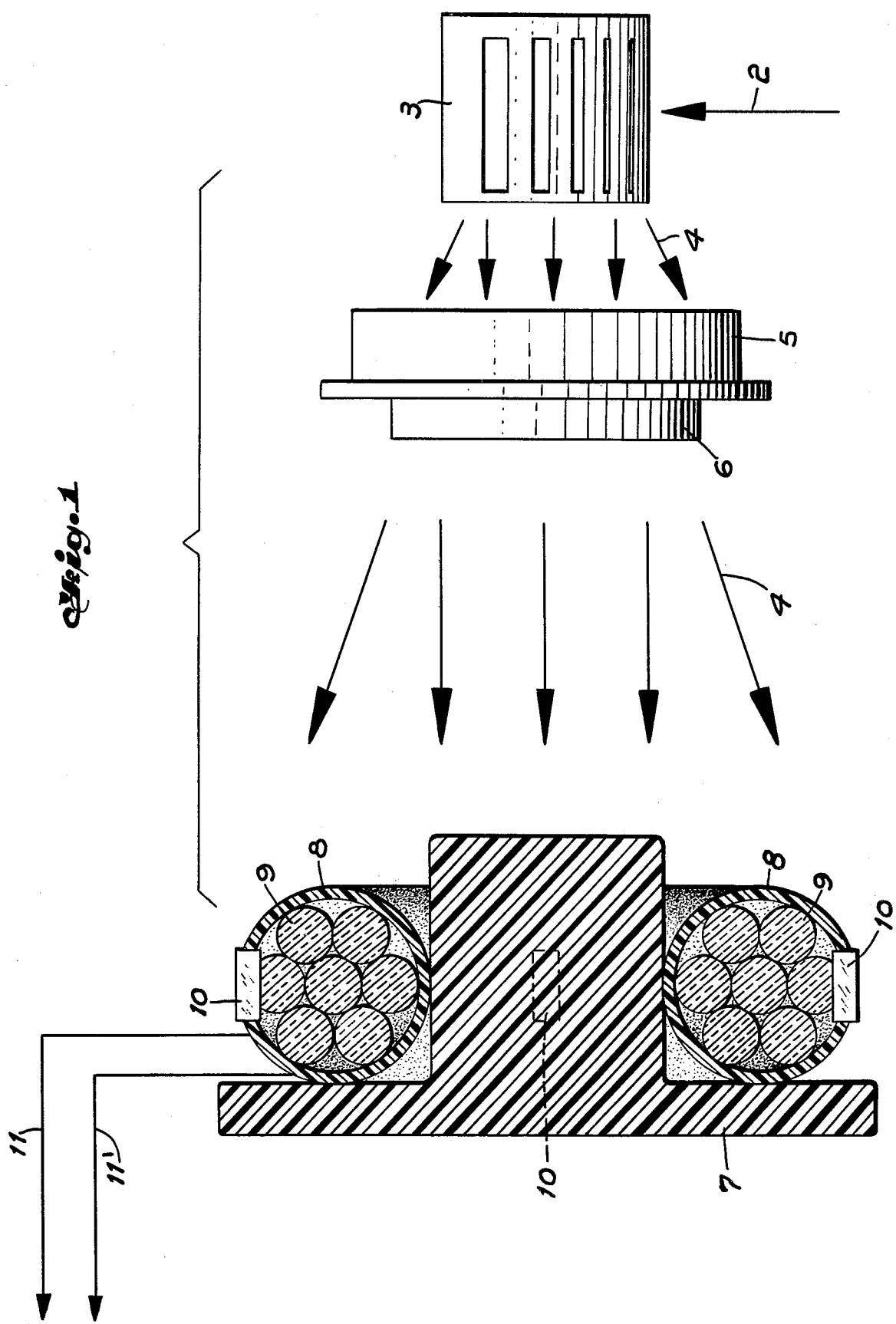
FIG. 1 is a cross sectional representation of the equipment utilized in performing the method of radiation hardness of this invention.

FIG. 1 shows one type of apparatus used for generating sufficient nuclear radiations and particles to cause a decrease in the number of defects within the plastic clad optical fibers. A linear accelerator beam 2 is directed upon a suitably placed target 3 such that the nuclear radiation beam 4 is directed through a lead plate 5, an aluminum plate 6, onto a spool 7 containing a coil 8 of optical fibers 9. In order to determine the actual quantity of radiation incident upon the fibers 9 several thermoluminescent dosimeters, (TLD) 10 were placed at different locations on the coiled fiber to determine the average exposure dose. In order to obtain an integrated sample of the actual radiation dosage level one TLD 10 was placed at the center of the spool 7 and 4 other TLD's 10 were placed symetrically around the spool 7.

In order to determine the absorption loss characteristics of the optical fibers 9 continuous optical measurements were performed by means of the pair of optical leads 11, 11' one of which (11) was attached to an LED (light emitting diode) for providing a constant level of light intensity to the fibers during radiation while the other fiber lead (11') was connected to a PIN diode for measuring the intensity of the illumination from the LED through the fibers both during and after exposure to the high energy radiation.

By the apparatus of FIG. 1 therefore, various levels of nuclear radiation can be directed onto the fibers while the effects of the irradiation can be continuously and accurately determined without interfering in any way with the fiber irradiation process.

Figure 2:
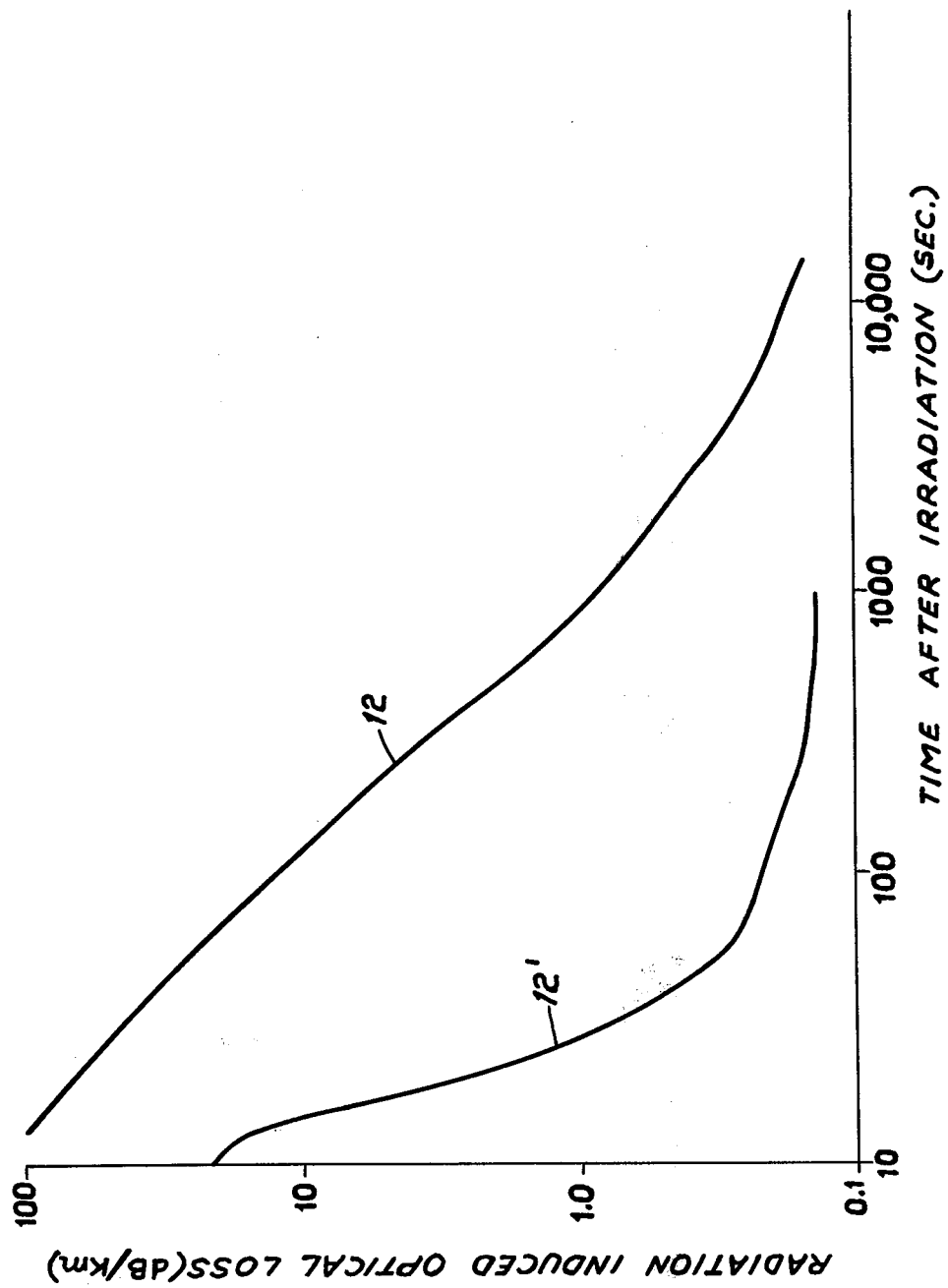
FIG. 2 is a graphic representation of the effects of pre-irradiation hardness on an optical fiber.

FIG. 2 is a graphic representation 12 of the effects of exposure to a fairly high dose of nuclear radiation on a plastic clad silica optical fiber without pretreating the fiber by the method of this invention. Also shown is the graphic representation 12' of the same fiber after treating with a substantial dose of a nuclear radiation to cause the fiber to become radiation-hardened. The radiation-hardened fiber shows a lower radiation induced optical loss than the same fiber before treatment and a much faster recovery rate after radiation exposure. The difference between the fibers before and after treatment for radiation-hardness can be realized from the representation of FIG. 2 since the same fiber was used to produce the data shown with the high level of radiation induced optical loss and the lower level shown. The difference in the levels of the induced optical loss therefore, is accountable by the radiation-hardness treatment since the level of irradiation producing the losses represented both curves is identical.

In order to determine the effect of relative doses of nuclear radiation on plastic clad silica core optical fibers the fibers were irradiated with the equivalence of 1,000 rads of gamma irradiation and approximately $10^9$ n/cm$^2$ of neutron radiation. This irradiation caused the loss indicated as curve 12 of FIG. 2 where the peak radiation induced optical loss ten seconds after the radiation measured as high as 113 dB/Km. The initial recovery rate after exposure measured 19 dB/Km/sec. After a sufficient period of time the optical fiber recovered from the effects of the radiation induced loss to provide transmission approximately equivalent to that before exposure to radiation. In order to determine the effect of radiation-hardening the same fiber was then submitted to a large dose of gamma and neutron radiation equivalent to 100,000 rads. The radiation induced loss for the fiber ten seconds after irradiation measured 108/dB/Km. This is roughly equivalent to the measured loss for the same fiber when exposed to the previous radiation dosage of 1,000 rads. The recovery rate after the high level exposure measured 18 dB/Km/sec. which is roughly equivalent to the recovery rate for the lower 1,000 rad irradiation. After a sufficient period of time the transmission through the radiation-hardened optical fiber reached the value acquired before exposure to the high level of irradiation. The same fiber was then subjected to 1,000 rads similar to the dosage received before the high level radiation treatment for hardness. The induced loss for the hardened fiber measured 27.9 dB/Km as indicated at 12' in FIG. 2. The recovery time for the hardened fiber was approximately 5 dB/Km/sec. This shows that for an exposure dose of approximately 1000 rads of gamma and neutron mixed flux irradiation plastic clad silica optical fibers sustain an optical loss slightly in excess of 100 dB/Km if measured ten seconds after exposure without pretreatment for radiation-hardness.

Treating the fibers by exposure roughly equivalent to ten times the test level of irradiation results in a substantially lower induced radiation loss and a substantially decreased recovery time.

Since the defect site theory leading to the inventive method of radiation-hardness for silica core optical fibers shows that the fibers can become relatively immune to subsequent exposure to radiation, this theory can be extended to include other types of optical fibers containing both plastic and glass materials. Glass on glass optical fibers manufactured by the method of chemical vapor deposition, are defined herein as having a material with an additive for increasing the index on refraction and a glass cladding which either contains pure silica or silica plus an additive to lower the refraction index. The method of radiation-hardness applies in a similar manner to glass on glass fibers. This is due to the fact that the high radiation induced loss observed in the unhardened fiber is in part caused by the fiber drawing induced defects in glass optical fibers.

Experiments with silica core optical fibers having different grades of silicone resin cladding material indicate that the silicone material per se becomes hardened to various degrees during the irradiation hardening process. Although the site defect mechanism does not strictly extend to the silicone resins in the same manner as for silica, radiation hardness does render the silicone material relatively immune to future radiation exposure in a manner similar to that for silica, but to a lesser extent.

Optical fibers consisting of a plastic core and a plastic cladding can also be radiation-hardened in the manner described for hardening plastic on glass and glass on glass optical fibers to varying degrees. The extent to which plastic on plastic optical fibers, that is, fibers containing plastic cores of high refractive index and plastic cladding of lower refractive index can be hardened by the inventive method of pre-irradiation exposure depends to certain extent upon the composition of the plastic materials employed.

Although the invention is directed to the pretreatment of plastic and glass materials by the method of exposure to high dosages of nuclear and gamma irradiation for optical communication purposes this is by way of example. The invention finds application wherever glass and plastic materials will be used in situations where absorption loss is likely to occur upon exposure to nuclear radiation.

We claim:

1. A method of pretreating an optical fiber to render the fiber less susceptible to radiation induced optical transmission losses that could result from subsequent exposure to nuclear radiation from a second source comprising the step of:
   exposing the optical fiber to nuclear radiation from a first source to pretreat the fiber and to render it less susceptible to said subsequent exposure to further nuclear radiation that could result from said second source.

2. The method of claim 1 wherein the optical fiber comprises a glass on glass optical fiber.

3. The method of claim 1 wherein the optical fiber comprises a plastic clad glass optical fiber.

4. The method of claim 1 wherein the optical fiber comprises a plastic on plastic optical fiber.

5. The method of claim 2 wherein the glass optical fiber comprises a glass core material having a first composition and a second composition material added to the first composition to increase the index of refraction.

6. The method of claim 2 wherein the glass-on-glass optical fiber has a glass cladding on a glass core and wherein the glass cladding contains a glass additive material to lower the refractive index of the glass cladding.

7. The method of claim 1 wherein the optical fiber comprises plastic clad silica.

8. The method of claim 1 wherein the nuclear source of first nuclear radiation comprises a mixed flux gamma and neutron radiation source.

9. The method of claim 8 wherein the source of nuclear radiation comprises a linear accelerator.

10. The method of claim 1 wherein the dose of radiation comprises at least $10^3$ rads.

11. The method of claim 1 wherein the first nuclear radiation source comprises a source of gamma rays.

12. The method of claim 11 wherein the gamma radiation source provides at least $10^3$ rads of gamma irradiation.

13. The method of claim 1 wherein the first nuclear radiation source comprises a high energy electron source.

14. The method of claim 1 wherein the first nuclear radiation source comprises a source of neutron radiation.

15. The method of claim 1 wherein the first nuclear source provides $10^5$ rads of mixed gamma and neutron radiation.

* * * * *